July 17, 1962 A. K. LITTWIN 3,045,165
ELECTRICAL CONTROL MEANS
Filed Jan. 30, 1957 4 Sheets-Sheet 1
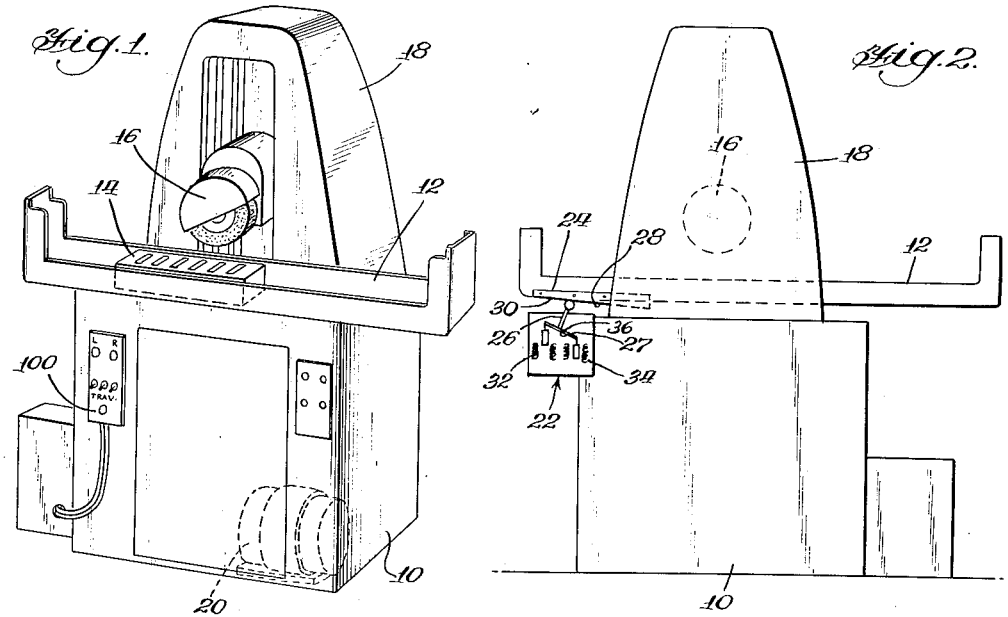
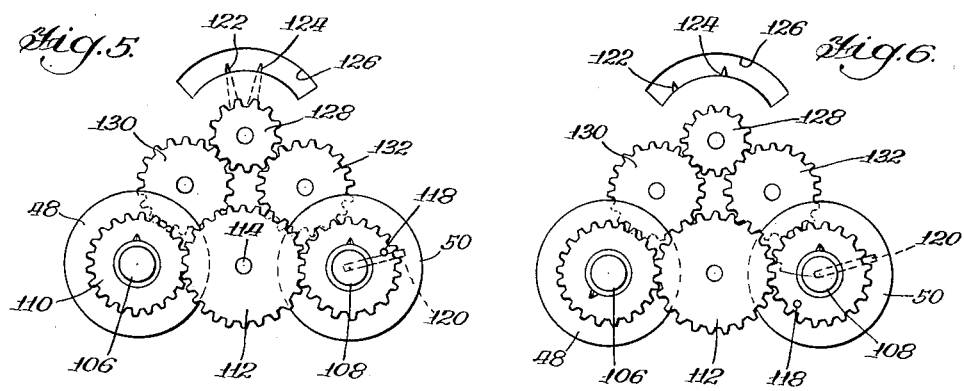
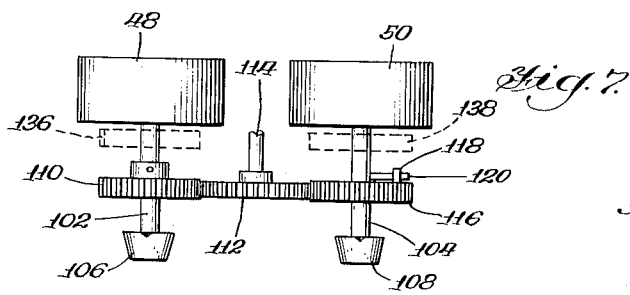
INVENTOR.
Arthur K. Littwin
BY Horton, Davis,
Brewer & Brugman
Attys.

July 17, 1962

A. K. LITTWIN 3,045,165

ELECTRICAL CONTROL MEANS

Filed Jan. 30, 1957

INVENTOR.
Arthur K. Littwin
BY Horton, Davis,
Brewer + Brugman
Attys.

July 17, 1962  A. K. LITTWIN  3,045,165
ELECTRICAL CONTROL MEANS
Filed Jan. 30, 1957  4 Sheets-Sheet 4

INVENTOR.
Arthur K. Littwin
BY Horton, Davis
Brewer & Bruguan
Attys.

United States Patent Office 3,045,165
Patented July 17, 1962

3,045,165
ELECTRICAL CONTROL MEANS
Arthur K. Littwin, Lincolnwood, Ill., assignor, by mesne assignments, to Robert L. Littwin, Arthur K. Littwin, and Horace A. Young, Chicago, Ill., as trustees
Filed Jan. 30, 1957, Ser. No. 637,140
20 Claims. (Cl. 318—286)

The present invention relates to control means and more particularly electrical control means.

The control means of the invention has particular adaptation to operating devices in which it is desired to limit the operation of the device in a given direction of movement, or in a given sense. The control means includes an arrangement for reversing the direction of movement, or sense of operation, alternately at opposite limits of a range of operation.

The control means therefore is especially adaptable to reciprocating devices, and one such reciprocating device is a work table on which a work piece is mounted for carrying it in the reciprocating movements of the table for performing operations thereon by a tool such as a grinding machine, cutter, etc.

An object of the invention is to provide novel control means of the foregoing general nature.

An important feature of the invention has to do with making adjustments in the control means. In the case of a reciprocating device such as a work table of the character indicated above, it is desired that it reciprocate between certain limits, and further that the user be able to adjust the limits of the range of movement, since various work pieces being worked on require working operations of different natures or extending through different ranges of reciprocation. A simple example of such different operations may reside in the difference in sizes of work pieces, as for example any large piece would require a longer range of reciprocation than would a small piece. It is desirable that any given reciprocating table be readily and easily adaptable to work pieces of different sizes and character, and it is further desirable that the table not reciprocate through a range of movement materially greater than that necessary for the dimensions of the piece being worked on. Accordingly it is desired to provide means for adjusting the range of movement of the reciprocating table in accordance with requirements for any given work piece.

Additionally, it may be desired to vary or adjust the range of movement of the reciprocating table in accordance with different portions of any given work piece. For example, assume the work table with a work piece thereon is reciprocated through a given range at the beginning of an operation and the tool working on the work piece moves in a direction transverse to the direction of reciprocation of the table. In a fore portion of the operation it may be necessary for the table to reciprocate through a large range because of the dimensions of the work piece at that location while in an after portion of the operation, it may be desirable to adjust the apparatus so that the table will reciprocate through only a small or short range of movement. It thus becomes desirable to make such adjustment with respect to the range of reciprocation of the table while an operation is being performed on the work piece. Heretofore it has not been practical to make such adjustments during the operation on the work piece, and while the reciprocating table is in motion, but instead it has been necessary or practicable to stop the table and make the desired adjustment and again restart it.

An object of the invention is to provide novel control apparatus of the general character indicated above, in which adjustments in the range of a reciprocating part such as a table may be made while the part is in motion.

Another object is to provide apparatus of the general character noted above in which means is provided for making adjustments therein, with respect to the range of movement of a reciprocating part, with greater effectiveness than has been possible heretofore.

Still another object is to provide control means in apparatus of the general character referred to above in which the adjustments referred to may be made at a point remote from the apparatus.

Another object is to provide a control circuit employing trigger action control by electron tubes in response to variable inductances, which are varied by the position of the controlled device, such as a reciprocating table.

Another object is to provide an electron tube control circuit for a reciprocating device of the nature indicated wherein drifting of the effective setting, as has heretofore been associated with electron tubes, is eliminated.

A further object is to provide in a reciprocating device of the foregoing character, switch means at spaced positions corresponding to the ends of a range of reciprocation of a part, for controlling the reversing movements of the reciprocating part, in which the switch means are adjustable for determining the limits and location of a range of reciprocation within a greater range corresponding with the capacity of the device.

Another object is to provide in a reciprocating device of the kind indicated, reversing control means corresponding to limits of reciprocation of a part, in which the reversing control means are independently adjustable for determining the corresponding limit of reciprocation of the part, and in which the reversing control means are interconnected in a novel manner for providing a minimum range of reciprocation of the part and this range can be shifted along a greater range by manipulating only one of the reversing control means.

A still further object is to provide switch means and circuit means for controlling a reciprocating device of the general nature referred to above in which the switch means are arranged at each of opposite ends of the range of movement of the reciprocating device, and are only momentarily conditioned by the work table for effecting reverse movement of the work table, in which holding circuits are utilized for maintaining the means for driving the reciprocating table in the respective direction until it is reversed by the switch means at the opposite end of the range of movement.

Another object of the invention is to provide a reciprocating device of the general character noted above, in which the range of movement of the reciprocating table can be adjusted in extremely fine increments, and even in infinitesimal increments.

Other objects and advantages of the invention will appear from the following detail description taken in conjunction with the accompanying drawings in which:

FIGURE 1 is a front view of the essential parts of a machine to which the present invention is applied;

FIG. 2 is a rear view;

FIG. 5 is a view, somewhat diagrammatic in nature, of certain control means and related parts;

FIG. 6 is a view similar to FIG. 5, but with the parts in a different relative position;

FIG. 7 is a plan view of certain of the elements of FIG. 5;

Figure 3:
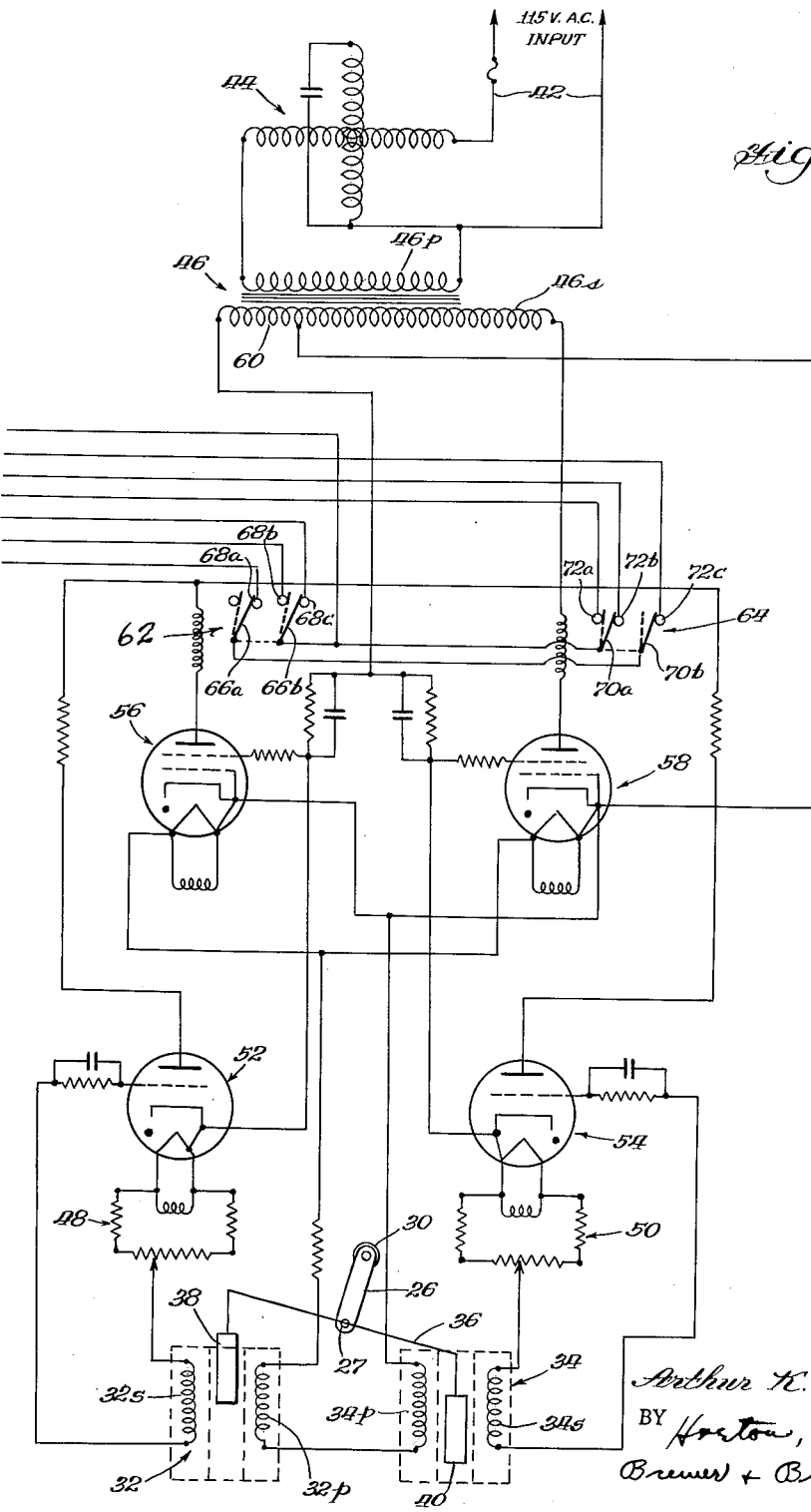
FIG. 3 is a diagram of a portion of the circuit utilized for controlling movements of the reciprocating table.

Referring in detail to the accompanying drawings, attention is directed to FIGS. 1 and 2 which illustrate the main or essential parts of a machine embodying the features of the invention. As noted above, the invention may be utilized with any of a number of different devices, the specific device in the present instance being a machine tool having a reciprocating work table. The machine includes a suitable base or supporting means 10 on which is mounted a work table 12 mounted on ways for reciprocation transversely as viewed in FIGS. 1 and 2. This form of machine tool is well known and the reciprocating work table 12 includes a means for holding a work piece such as a magnetic chuck 14. The magnetic chuck is controlled by suitable controls such as switch means (not shown) and the work piece, when positioned on the magnetic chuck, is positioned for working on by a tool head 16 mounted in a structure which includes upright columns 18. The tool head 16 is mounted for reciprocation in fore-and-aft directions or transverse to the direction of the reciprocation of the work table 12.

The work table 12 is driven by suitable driving means which, in the present instance, is a reversible electric motor 20. It will be understood that any of various kinds of driving means may be utilized, such as a hydraulic ram, which may be reversed in direction of operation. In any event, the driving means is controlled by an electric circuit shown in FIGS. 3 and 4, this same circuit being utilized for driving means other than an electric motor. A suitable driving connection is interposed between the motor 20 and the reciprocating work table 12, such as a speed reducer of well-known type (not shown) and which may include a rack on the table and a pinion driven by the motor through the speed reducer. Since such driving means is of conventional and standard character, it is not illustrated herein.

In the contemplation of the present invention, the driving means, such as the electric motor 20, is reversed in direction of operation at each end of the range of movement of the reciprocating work table 12 and the reversing function is controlled by the work table itself.

The base 10 and work table 12 are provided with control means indicated generally at 22 for reversing the direction of travel of the work table and include cam means or a taper 24 on the table and a pivoted lever arm 26 and associated parts on the base.

The cam means or taper 24 may be and preferably is disposed adjacent one end of the work table and has an inclined surface 28 on its lower edge engaging a roller 30 on the swinging end of the lever arm 26. This cam means or taper 24 is mounted on the table by suitable means such as by riveting or bolting and the inclined surface 28 thereof is brought into play by the reciprocating motion of the work table, and serves to deflect the lever arm 26 and effect corresponding control thereby.

The control means 22 includes a pair of induction coil means 32 and 34 shown diagrammatically in FIG. 2 and described in detail in connection with the circuit of FIGS. 3 and 4. Associated with the lever arm 26 is a beam or bar 36 indicated diagrammatically in FIG. 3 mounted by suitable means in a control box housing the control means 22 and fixed to the lever arm 26 for pivotal or rocking movement therewith. Mounted on the ends of the beam or bar 36 are cores or armatures 38 and 40, respectively, arranged for cooperation with the respective coils 32 and 34 and varying the induction therein. The cores or armatures 38 and 40 are mounted in any suitable manner on the beam or bar so as to be aligned longitudinally with the respective coils 32 and 34. The details of the mechanical arrangement of this feature are not essential to the invention and may be as desired. At this point, suffice it to say that the cores or armatures are arranged for insertion into and withdrawal from the coils 32 and 34 for varying the inductance therein.

These cores or armatures 38 and 40 are so moved in response to pivotal or rocking movement of the bar 36, which in turn is moved by swinging movement of the lever arm 26. The beam is pivoted at 27, having a common pivot axis with the lever arm 26. The relation between the cam means or taper 24 (FIG. 2) and the lever arm 26 and related elements is such that when the work table 12 is in a central position the cores or armatures 38 and 40 assume a central or neutral position, which may be in a straight horizontal position, with the cores or armatures extending into the respective coils equal amounts. When the work table 12 moves in a first direction, e.g., to the left as viewed in FIG. 2, the inclined surface 28 rocks the lever arm 26 in counterclockwise direction, rocking the beam or bar 36 in the same direction and extending the core 38 into its coils further and correspondingly withdrawing the core or armature 40 from its coils. In movement of the work table in opposite direction, the camming effect from the inclined surface 28 is removed and a suitable spring (not shown) or other means moves the lever arm and related parts in clockwise direction (FIG. 2). The latter movement results in the core or armature 38 being relatively withdrawn from its coils and the core or armature 40 being extended further into its coils. To the end of disposing the beam 36 in a central or neutral position when the work table 12 is centered, the various elements are so related that the longitudinal mid point of the cam means or taper 24 engages the roller 30 and this may be effected by disposing the lever arm 26 out of perpendicular relation with the beam or bar 36.

Attention is directed next to FIG. 3 showing a diagram of a portion of the circuit for controlling the drive means or electric motor 20. In this circuit diagram is included a representation of the beam or bar 36 and lever arm 26. The coils or transformers 32 and 34 are illustrated in association with the respective cores or armatures 38 and 40, and the latter assume a position determined by the position of the table as viewed in FIG. 2, or to the left as viewed by an operator from the front. In such position the core or armature 40 is lowered to its maximum position into the transformer or coils 34 while the core 38 is withdrawn a maximum extent from the associated transformer or coils 32.

Referring generally to the circuit portion shown in FIG. 3, a power line 42 is provided having suitable voltage, such, for example, as 115 volts A.C., in which is connected a constant voltage transformer 44 of suitable type. A transformer 46 in the line has its secondary winding 46s arranged for providing suitable voltage on the primary windings 32p and 34p, respectively, of the transformers 32 and 34. The secondary windings of these transformers 32s and 34s, respectively, are connected through potentiometer means 48 and 50, respectively, with tube means 52 and 54, in suitable circuit for imposing bias on the tube means in accordance with variation in the voltage in the transformers produced by the cores 38 and 40. The tube means 52 and 54 are normally non-conducting and become conducting upon being fired in response to the imposition of the necessary voltage thereon as controlled by the cores 38 and 40.

Second tube means 56 and 58 are associated with tube means 52 and 54, respectively, and are normally non-conducting. A grid bias is normally imposed on the latter tube means 56 and 58 as generated through a connection 60 with the secondary 46s of the transformer 46. The tube means 56 and 58 are controlled by the respective tube means 52 and 54, as to condition of conducting. Assuming a specific example, the tube means 56 is controlled by the tube means 52 upon the latter becoming conducting. The tube means 52 is controlled in turn by the core or armature 38. When the latter is lowered into the transformer or coils 32 a sufficient extent, an induced voltage is imposed on the tube 52, effecting a positive opposing bias thereon that will fire the tube means and enable it to conduct, the tube theretofore not conducting, as indicated above. When the tube means 52 becomes conducting, the output thereof generates an opposing bias on the tube means 56 and fires the latter, enabling the tube means to become conducting. When the tube means 56 thus becomes conducting, it actuates a relay 62. A similar relay 64 is associated with the tube means 58 and is actuated by the tube means 58 when the latter becomes conducting, as controlled by the tube means 54, in a manner similar to that described in connection with tube means 56 and 52.

For purposes of reference it will be noted that the relay 62 includes switch blades 66a and 66b, and contacts 68a, 68b, and 68c. Similarly the relay 64 includes switch blades 70a and 70b and contacts 72a, 72b, and 72c. The relays 62 and 64 are illustrated in their de-energized conditions or positions in FIG. 3, and the positions they assume in normal operation of the device except momentarily at each end of the movement of the reciprocating table when they are energized; in the latter condition they assume the dotted line positions. In similar manner the switch blades 70a and 70b of the relay 64, when the relay is energized, move to their dotted line position and when the relay is de-energized they assume their full line position shown in FIG. 3.

Figure 4:
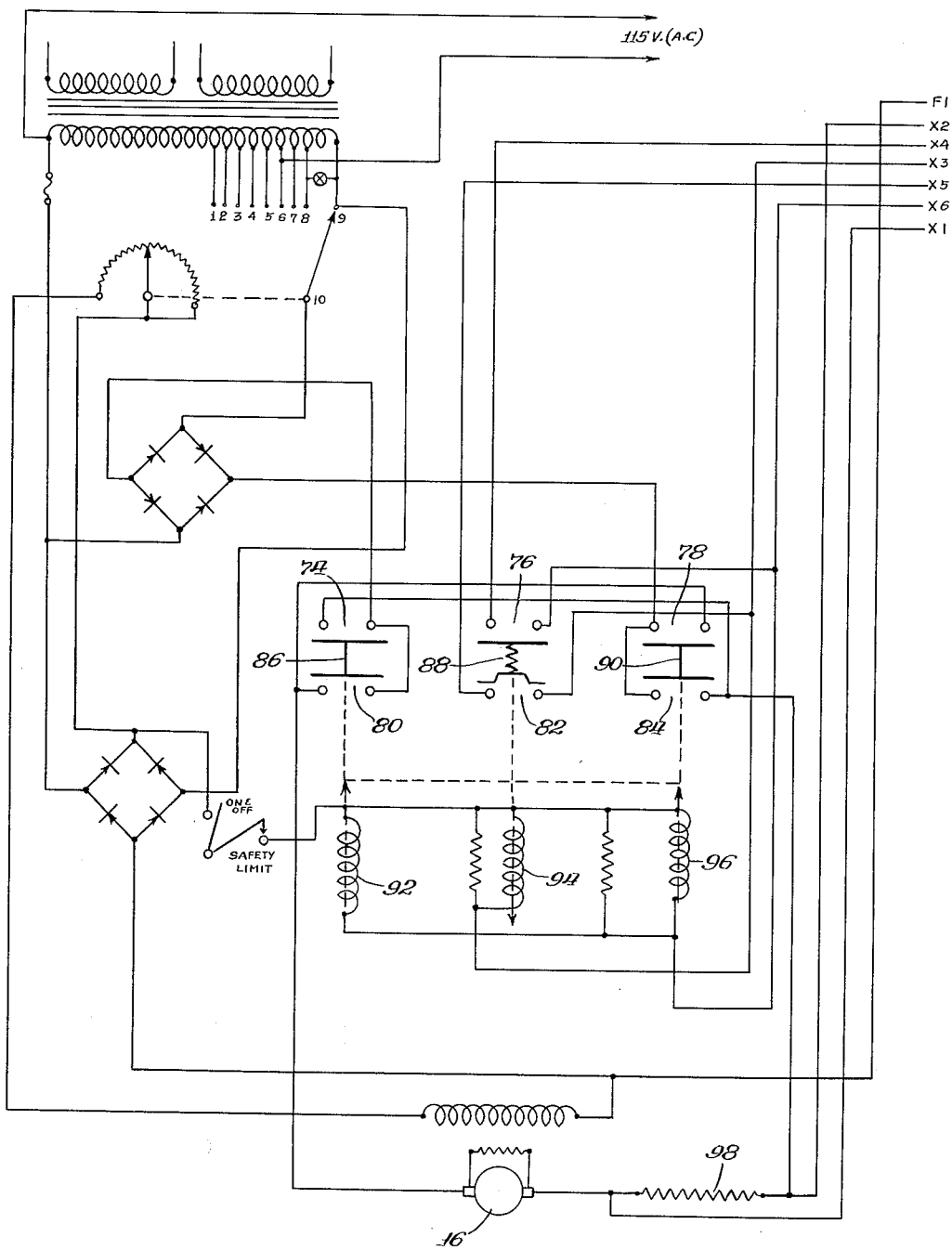
FIG. 4 is a diagram of another portion of the circuit.

With reference to the operation of the device, attention is directed to FIGS. 3 and 4. The motor 20 referred to in connection with FIGS. 1 and 2 is shown in the circuit diagram of FIG. 4. Assume a starting position illustrated in FIG. 3 with the core 38 withdrawn from the associated transformer or coils 32 and the core 40 projected fully into the associated transformer or coils 34. In such a position or condition the motor 20 for driving the reciprocating table operates in a first direction. The table 12 in such direction of operation of the motor moves in a corresponding direction, which, in the arrangement of elements as described, is from right to left (FIG. 2). In such movement of the table, the beam or bar 36 is rocked counterclockwise as explained above and an increased voltage is induced in the secondary 32s and an opposing bias is thereby imposed on the tube means 52 enabling the latter to fire and conduct. The output of this tube means fires the associated tube means 56, which in turn becomes conducting and energizes the relay 62. Upon such energization of the relay 62 the driving electric motor 20 is reversed in direction and the reciprocating table 10 is then driven in the opposite direction, namely, from left to right as viewed in FIG. 2. This movement of the table in the direction noted rocks the beam or bar 36 in clockwise direction, as explained above, and lowers the core 40 into the associated transformer or coils 34 while at the same time raising the core 38 and withdrawing it from its transformer or coils 32. Upon the core 40 entering into the transformer 34 a sufficient extent, an increased voltage is induced therein which provides an opposing bias on the tube means 54, which when it fires and conducts imposes its output as an opposing bias on the tube means 58 which in turn fires and conducts. When the latter conducts, the relay 64 is energized, and the driving motor 20 is again reversed and the cycle repeats.

The action in reversing the direction of drive of the table 12 is only momentary so that the respective core, 38 or 40, remains or dwells in a position for firing the respective tube means only momentarily. As a result the core is withdrawn from such firing position and the associated tube means ceases to fire. The potentiometer means 48 and 50 associated with the respective tube means and transformers may be set to the desired voltage value for firing the respective tube means at a corresponding position of the core relative to the transformer. Upon the core beginning its withdrawing movement from the transformer, it immediately withdraws from the position in which the associated tube means fires. Hence, the potentiometer means (48 or 50) associated therewith may be set to any desired point for firing the tube means at any extent of movement of the core into the transformer, and with the further result that either potentiometer means (48 or 50) may be set relative to its associated end of the movement of the reciprocating table independently of the other so that the table may be reciprocated through a range located at any desired position with respect to the base 10 on which the table is mounted, so that if a work piece, for example, should be located off-center on the table or should be of such shape that a portion of it being worked on is displaced from the center of the table, the desired range of movement of the table may be provided at any location or position displaced relative to the central or median position, or symmetrical position relative to the base.

Attention is directed next to the portion of the circuit shown in FIG. 4 which is controlled by the relays 62 and 64. In this circuit portion are contacts 74, 76, 78, 80, 82, and 84. Associated with these contacts are sets of contacts 86, 88, and 90, the set 86 being arranged with contacts 74 and 80; the set 88 associated with contacts 76 and 82; and the set 90 associated with contacts 78 and 84. The sets of contacts, namely 86, 88, and 90 are arranged for actuation respectively by electromagnets 92, 94, and 96, forming relays with the associated sets. The contacts 74, 76, 78, 80, and 84 are normally open while the contacts 82 are normally closed when the current is turned off and the apparatus is at rest. When the control current is turned on the electromagnet 94 is energized through the contacts 82, lead X5, contact 68c to power lead F1. The three sets of contacts 86, 88, and 90 are ganged to move in unison, and when electromagnet 94 is energized the contacts 80 and 84 are closed and the contacts 82 remain closed. In this operation when the contacts 80 and 84 close, current is supplied to the motor armature in a first direction, i.e., the direction assumed above in the description of the device in connection with the beam or bar 36 in which the core 38 is being lowered into the associated transformer or coils 32. The motor 20 thus operates in the assumed direction and the work table moves in the corresponding direction, namely from right to left as viewed in FIG. 2, whereupon the beam 36 is rocked counterclockwise and effects the lowering of the core 38 into the transformer 32. It will be recalled from the description above that although the core 38 is being lowered into the transformer the respective tube means 52 and 56 remain off or non-conducting. This non-conducting condition is provided by the fixed bias produced by the potentiometer 48. Similarly the tube means 56 is in a non-conducting condition.

When the core 38, however, is lowered sufficiently into the transformer 32, it produces an induced voltage in the manner described above, and an opposing bias on the tube means and, through the tube means 52 and 56, energizes the relay 62. When this relay is thus energized, the contacts 68a and 68c are opened and the contacts 68b are closed. Closure of the contacts 68a puts a resistance 98 in series with the armature of the motor 20 which gradually slows down or cushions the motor. In response to closure of the contacts 68b the electromagnets 92 and 96 are energized through lead X6, contacts 68b, to power lead F1. Energization of the electromagnets 92 and 96, in turn, closes contacts 74, 76, and 78, and opens contacts 82, whereby current is supplied to the motor 20 in the opposite direction through contacts 74 and 78, and the electromagnet 94 is retained in de-energized position by reason of the contacts 82 remaining open. After the relay 62 is de-energized, which opens the contacts 68b, the electromagnets 92 and 96 are retained in energized position through the contacts 76, lead X4, contacts 6 to the power lead F1.

Thus the driving motor 20 is reversed and a holding circuit is established for continuing the operation of the motor in such reverse direction while the relay 62 is enabled to be drawn to its normal or de-energized position shown in FIG. 3 after having been energized by the tube means in response to the work table reaching the end of its range of movement in the corresponding direction. The table, therefore, continues in such reverse direction which, in this instance, is from the right to the left in FIG. 2, and the beam 36 is accordingly rocked in the corresponding direction, namely, in counterclockwise direction.

In connection with the beam 36 it may be assumed that a yieldable means normally retains the beam in a normal or horizontal position and biases it to that position after having been rocked out of position in either direction by the work table. Such biasing means may be of conventional type. Upon the table thus reversing in the direction noted, and consequent rocking of the beam 36 in clockwise direction, the core 38 is withdrawn from the corresponding transformer 32 while the core 40 is being lowered into the corresponding transformer 34. This movement eventually results in the tube means 54 and 58 assuming a conducting condition as described above, and consequent actuation of the relay 64. The relay 64 is actuated upon the core 40 being lowered into the transformer 34 an appropriate distance, and after the core 38 at the opposite end is withdrawn, or at least partially withdrawn, from the transformer 32.

When the relay 64 is actuated as mentioned, the contacts 72c and 72b are opened, and the contacts 72a are closed. When the contacts 72c are opened, the resistance 98 is again put in the armature circuit of the motor 20 to slow down or cushion the motor. Opening of the contacts 72b results in de-energization of the electromagnets 92 and 96 which in turn results in dropping of the sets of contacts 86, 88, and 90 to thereby open the contacts 74, 76, and 78, and close contacts 82. Opening of the contacts 74 and 78 cuts off the current to the driving motor 20. When the contacts 76 are opened, the holding circuit for the transformers 92 and 96 is opened. Closure of the contacts 82 energizes the electromagnet 94, as does the closure of the contacts 72a. When the electromagnet 94 is energized, the contacts 80, 82, and 84 are closed so as to reverse the current flow through the driving motor 20. When the relay 64 is de-energized due to the beginning movement of the withdrawal of the core 40 from the transformer 34, the contacts 72a are opened. However, the contacts 82 hold the electromagnet 94 in energized position, through the lead X5, and contacts 68c to power lead F1. The cycle is thus completed and it repeats according to the foregoing.

It will be appreciated from the foregoing that the control for adjusting the range or position of movement of the reciprocating table may be made at a remote point. The potentiometer means 48 and 50 may be adjusted to appropriate condition for adjusting the point at which the cores 38 or 40, relative to the corresponding transformer 32 or 34, produces the necessary induced voltage for firing the respective tube means 52 or 54. The potentiometer means 48 and 50 may be located at any convenient point, such as on a panel 100 which may be mounted on the base 10 or other location. Upon rotation of the knobs or dials on the potentiometer means, in a customary manner, a corresponding setting may be provided for determining the point at which the tube means fire and become conducting. Adjustments may be made in the potentiometer means even during movement of the table, and it is not necessary to stop the table in order to make such adjustments. The potentiometer means 48 and 50 are settable independently of each other and, if it is desired to have the table reciprocate in a range offset or non-symmetrical with respect to the base, the potentiometer means may be set to define the limits of reciprocation at any such desired location. For example, if it should be desired to have the table reciprocate between a position at the right (FIG. 2) and another position adjacent the middle of the base, for example, the potentiometer means 50 may be adjusted to the extreme right while the potentiometer means 48 is adjusted at a similar position adjacent its extreme right. Each thus determines the point at which the respective tube means is fired and is not dependent upon nor does it interfere with the function of the other.

One form of the invention includes an arrangement wherein, in making adjustments in the operable range of reciprocation of the work table, the control means such as the potentiometers 48 and 50 do not overlap in effect, that is, neither becomes effective until the work table is past or beyond the control of the other. It is desirable that the operable range of reciprocation be at a certain predetermined minimum, preferably quite small. For example, if a small work piece is being worked on by the tool head 16, it is desired that the table not move in either direction more than that necessary for the tool head to accomplish its purpose in that direction, whereupon the work table should reverse to the same effect in the opposite direction. A further desirable feature is that this minimum working range of reciprocation be positionable at any location along the maximum range of reciprocation of the table, with as great facility as possible.

A means for interconnecting the potentiometers 48 and 50 and for accomplishing the desirable results just mentioned, is shown in FIGS. 5 to 7, inclusive. In these figures certain of the elements are shown fully and others semi-diagrammatically or indicatively. The potentiometers are mounted by any suitable means on the panel 100 (FIG. 1), as will be understood, in accordance with usual practice. The potentiometers 48 and 50 are provided with shafts 102 and 104, respectively, having control knobs 106 and 108. On the shaft 102 is a gear 110 fixed thereon for rotation therewith, meshing with an intermediate or idler gear 112 suitably mounted as on a shaft 114 mounted on the panel 100. Another gear 116 similar to the gear 110 is mounted on the shaft 104, but rotatable relative thereto, and meshing with the intermediate gear 112. A pin 118 is fixed on the gear 116 and is positioned thereon for engagement by a finger or cam element 120 fixed on the shaft 104. Associated with the respective potentiometers are pointers 122 and 124 suitably mounted on the panel exposed through a window 126. These pointers are fixed on or otherwise operatively associated with gears 128 coaxially arranged and suitably mounted and in mesh with corresponding gears 130 and 132 (FIG. 5) in turn in mesh with gears 136 and 138 on the shafts 102 and 104 (FIG. 7). Upon rotation of the control knobs 106 and 108, corresponding movements of the pointers 122 and 124 is effected.

The connection between the shafts 102 and 104 through the gears mentioned establishes a means for transmitting rotation of one of the shafts to the other, upon certain relationship existing therebetween. Assume, for example, that the control knobs 106 and 108 are turned toward each other a maximum amount so that the pointers 122 and 124 are approximately at the mid point of their range of movement, and adjacent the vertical in FIG. 5. The pointers will not be coincident, but spaced apart to indicate a minimum working range of the work table. Then assume it were desired to rotate the knob 106 further to the right, or the knob 108 further to the left. Such movement of either knob as indicated will cause corresponding movement of the other knob in the same direction by means of the pin 118 and finger 120. In the centered position mentioned, the finger 120 is substantially in engagement with the pin 118. Further movement of the knob 108 to the left will result in the finger engaging the pin and rotating the gear 116 thereby. The rotation is transmitted through intermediate gear 112 and gear 110 fixed on the shaft 102 which then rotates the control element in the potentiometer 48. On the other hand, if the control knob 106 were rotated to the right from the position assumed, the rotation of the shaft 102 will result in rotation of the gear 110 fixed thereto and intermediate gear 112 and gear 116. The latter gear, acting through the pin 118, engages the finger 120 and rotates the shaft 104. Thus, when the control knobs or potentiometers are adjusted in maximum position toward each other, rotation of one results in rotation of the other in the respective directions indicated.

The position of the control knobs and the pointers 122 and 124 in their relatively proximate positions as described, establishes the minimum working range of the work table. It is desired that the length of this working range correspond with the requirements of the work to be done. In the practice of the present invention it may be fixed at a very small value with corresponding advantage in operation of the work table. Either control knob may be rotated away from the other without affecting the other. FIG. 6 indicates such position in which the control knob 106 has been rotated away from the other control knob, namely, in counterclockwise direction, and it will be seen that the pin 118 is separated from the finger 120.

This minimum working range may be shifted along the maximum range of operation of the table by turning the appropriate control knob 106 or 108 in the appropriate direction. For example, assuming such minimum working range to be positioned on the mid point and it is desired to shift it to some point to the right, rotation of the control knob 106 in clockwise direction will produce that result. If it is desired to shift that minimum working range to the left, it is done by rotating the control knob 108 in counterclockwise direction. The minimum working range may be shifted entirely across the maximum range of the reciprocation of the table if the minimum range is located adjacent one end of the maximum range, as will be understood by rotation of the appropriate control knob in the correct direction.

It is also desirable, in a modified form of the invention, to provide for the tube means to be arranged to act counter to each other adjacent the reversing position, each being energized for a small period before the other is de-energized so that the relay switches controlled thereby are actuated with greater precision due to the fact that the tube becoming active becomes so immediately upon de-energization of the other tube, as distinguished from an arrangement in which it becomes active solely upon being energized since the latter condition may vary because of variation in heating up of the tube.

Figure 8:
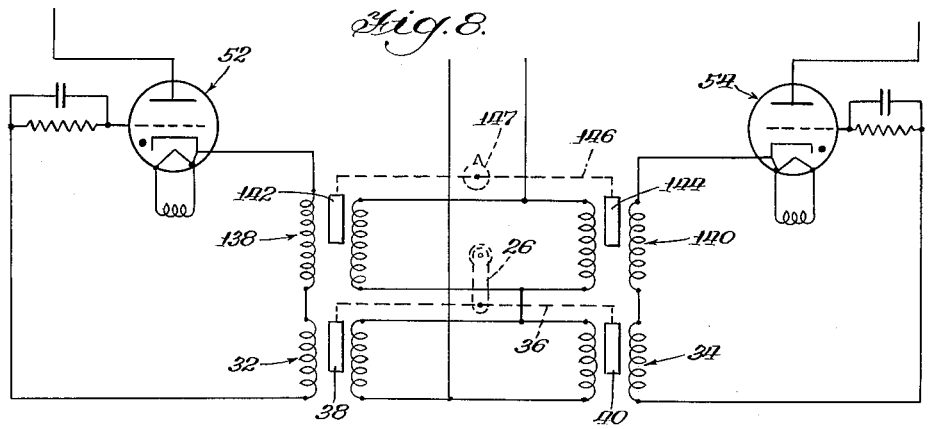
FIG. 8 is a circuit diagram having a modified form of reversing control means.

The modification of the invention shown in FIG. 8 makes it possible to vary the working range of reciprocation in infinitesimal amounts. While the foregoing control means is effective for varying the work range in very fine increments, it is, however, limited to the value represented between adjacent turns of the potentiometer and the increments of variation therefore are in the form of steps. In the arrangement of FIG. 8 this variation may be in infinitesimal increments. The circuit diagram of FIG. 8 includes the essential elements of the corresponding portion of the diagram of FIG. 3, but without the potentiometers. It will be seen that the tube means 52 and 54 are arranged for control by the cores 38 and 40 in association with the corresponding transformers 32 and 34, as described in connection with the circuit of FIG. 3. The cores 38 and 40 are operated by the beam or bar 36 in the manner described above. However, in replacement of the potentiometers 48 and 40 are additional transformers 138 and 140 which are controlled by cores 142 and 144 mounted on a beam or bar 146. The beam or bar 146 is adjusted by a suitable adjusting knob 147 for setting the cores 142 and 144 relative to the transformers 138 and 140 to counterbalance the effect of the transformers 32 and 34. The effect of such adjustments will be understood, the transformers having corresponding elements arranged in counteracting attitude. The extent to which the cores 132 and 134 may be projected into and withdrawn from their corresponding transformers may be varied in infinitesimal amounts and the point at which the corresponding tube means 52 and 54 are fired can be varied in infinitesimal increments. The arrangement of FIG. 8 is furthermore effective for preventing creeping effect in the limit setting. The variation in current due to the heating of the transformers 32 and 34 is exactly counteracted by variation in an opposite sense in current due to heating of the transformers 138 and 140.

Figure 9:
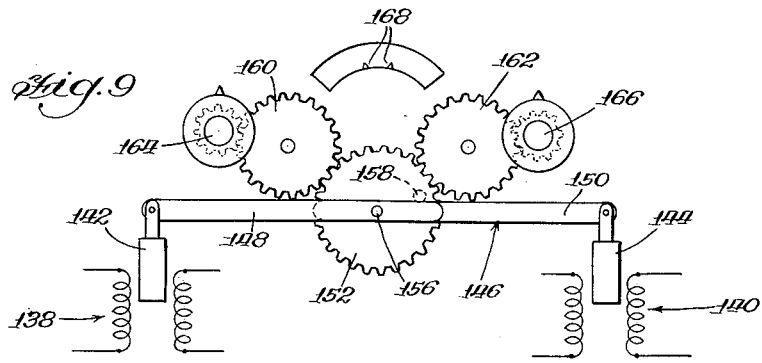
FIG. 9 is a view, somewhat diagrammatic in nature, of certain control elements associated with the modification of FIG. 8.
Figure 10:
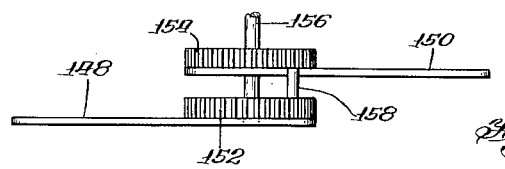
FIG. 10 is a top view of certain of the elements of FIG. 9.

The control means of FIG. 8 is also adapted to establishing a minimum working range and shifting that range in a manner generally similar to that described in connection with the arrangement of FIGS. 5 to 7. An arrangement for this purpose is shown in FIGS. 9 and 10 in which certain of the elements are indicated semi-diagrammatically. The control means of FIGS. 9 and 10 may be mounted in a suitable and conventional manner as on the panel 100 of FIG. 1, in replacement of the control means including the potentiometers 48 and 50. The beam or bar 146 is made up of two parts, 148 and 150, secured on respective gears 152 and 154, which in turn are suitably mounted on a shaft 156. A pin 158 is secured to one of the gears, e.g., the outer gear 152, and disposed for engaging the counterpart arm 150 on the inner gear. The gears are in mesh with respective trains of gears 160 and 162 for rotation by control knobs 164 and 166. Pointers 168 are arranged in a manner as described in connection with FIGS. 5 to 7. Assuming a minimum working range, disposed centrally, the pin 158 is at or engaged by the beam element or arm 150. Upon rotation of the control knob 166 to the left, for example, the gear 154 is rotated counterclockwise as is the arm 150. The latter engages the pin 158 and rotates the gear 152 and arm 148 in a similar direction. Rotation of the gear 152 effects rotation of the control knob 164 in the same direction. An opposite effect is produced by rotation of the control knob 164 to the right or clockwise. Further description of the operation is believed unnecessary, since it is the same as described in connection with FIGS. 5 to 7.

Figure 11:
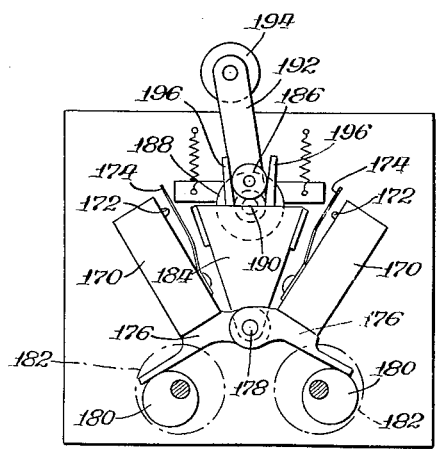
FIG. 11 is a view of the essential elements of novel reversing switch means utilized in one embodiment of the invention.

I also have found it possible to utilize switch means for control by the work table, and the elimination of the electronic tube means. Such switch means is shown in FIG. 11 in its essential respects, certain details of construction being omitted. Switch means 170 of conventional nature have pins 172 engageable by actuating fingers or leaves 174. These switches are mounted on suitable bases 176 on a common axis element 178 and are swingable about the axis element within small limits by means of cams 180 engaging the bases 176. The cams are provided with control knobs 182. The fingers or leaves 174 are actuated by a central element 184 similar to a lever in operation, mounted on the axis element 178 for swinging movement thereon, and engaging the fingers 174 alternately. The swinging movement of the element 184 is accomplished by a follower 186 which may be in the form of a roller mounted on a rotatable member 188 rotatable about an axis element 190 coaxial with an actuating arm 192. The latter has a roller 194 on its free swinging end mounted for engagement by the cam means or taper 24. The lever 192, as will be understood, is actuated by the cam means or taper 24 in the manner described above in connection with the first embodiment of the invention, further details of which are believed not necessary to be described. Upon swinging movement of the arm 192 in one direction or the other, the follower 186 engages one or the other of a pair of fingers 196 suitably mounted and preferably mounted on the axis element 178 and arranged for swinging the element 184 in corresponding direction. The fingers 196 are preferably independently mounted and are spring biased to a home position. The connection between the fingers 196 and the lever member 188 may be as desired, such as by friction.

The switches 170 are swingable toward and from each other, i.e., toward and from a central vertical axis. Upon movement of the switch means inwardly toward that axis the limits of reciprocation of the table are reduced, and upon movement of the switch means away from the axis, the limits are enlarged. Thus, the limits of the working range of the work table can be varied and shifted along the maximum range corresponding to the capacity of the machine. The adjustments necessary for accomplishing these results may be made while the machine is in operation. The adjustments thus made are in infinitesimal increments.

While I have disclosed herein certain preferred embodiments of the invention, it will be understood that changes may be made therein within the scope of the appended claims.

I claim:

1. In apparatus of the character disclosed, a reciprocable table, reversible drive means for driving the table, means for controlling the drive means including switch means associated with the table at each end of the range of movement of the table, tube means for controlling each switch means, means controlled by the movement of the table varying the bias on the tube means and rendering them conducting, and manually adjustable electrical means for independently varying the bias imposed on the tube means and thereby varying the points at which the tube means become conducting relative to the positions of the table and thereby varying the effective spacing between the tube means and switch means at the ends of the range of movement of the table.

2. Apparatus of the character disclosed comprising a reciprocable table, a reversible electrical motor for driving the table, switch means corresponding to each end of the range of movement of the table for controlling the electric motor for driving the table in a corresponding direction, tube means for controlling each switch means, each tube means including a first tube for actuating the respective switch means and a second tube controlling the bias on the first tube, transformer means for controlling the bias on the second tube, armature means for varying the voltage on each transformer means, and thereby rendering the tube means conducting, actuated by the table at respective ends of the range of movement thereof, and manually adjustable electrical means for independently varying the bias imposed on the tube means and thereby varying the points at which the tube means are rendered conducting relative to the positions of the table with respect to the ends of said range of movement.

3. In apparatus of the character disclosed, a reciprocable table, reversible drive means for driving the table, electric circuit means for controlling the drive means including switch means operative for reversing the direction of drive of the drive means corresponding to each end of a range of movement of the table, tube means for controlling each switch means, a transformer for each tube means, and a core for each transformer movable by the table relative to the transformer for varying the induced voltage thereof, and a second transformer for each tube means, and a core for each second transformer movable manually relative thereto to different set positions for varying the induced voltage thereof, the first and second transformers being of relatively opposed bias.

4. A reciprocable instrumentality and control means in combination therewith for use in controlling the movements thereof comprising a source of current, a pair of transformer means connected with said source, electronic tube means connected with each transformer means, reversing switch means operable by said tube means in respectively opposite directions in response to the tube means firing and conducting through their portions of the circuit, armature means movable into and out of said transformer means in mutually opposite directions for oppositely varying the induced voltage in the respective transformer means and thereby oppositely firing the tube means, and means for mounting the armature for such movement into and out of the transformer means by and in response to the movements of said reciprocable instrumentality.

5. The invention set out in claim 4 in which manually operable electrical means is provided for adjustably setting the points at which the tube means become firing relative to the positions of the reciprocable instrumentality.

6. A reciprocable instrumentality and electrical control means in combination therewith for use in controlling the movements thereof, comprising circuit means, reversible switch means in the circuit means, tube means in said circuit means associated with each end of a range of movement of the instrumentality, and adapted for actuation of the switch means alternately at respective ends of said range in response to alternate firing of the tube means and rendering of the corresponding portions of the circuit means conducting, means controlled by the instrumentality varying the bias imposed on the tube means according to the movement of the instrumentality, and means for varying the points at which the tube means are rendered firing and conducting relative to the movement of the instrumentality and thereby varying the effective spacing between the tube means.

7. Electrical control means for controlling the movements of a reciprocable instrumentality, comprising circuit means, a reversing switch in said circuit means, tube means associated with each end of a range of movement of the instrumentality to be controlled, and adapted to control the reversing switch upon being fired, a first pair of transformers in series with respective tube means, an armature adapted for moving into and out of each of said transformers for controlling the induced voltage therein and thereby controlling the firing of the respective tube means, means mounting said armatures for mutually alternately and oppositely moving them into and out of respective transformers in response to movement in opposite directions of the instrumentality to be controlled, a second pair of transformers respectively in series with the first pair of transformers, an armature adapted for moving into and out of each transformer of said second pair for controlling the induced voltage thereof and thereby controlling the firing of the respective tube means, the transformers of the second pair being oppositely arranged relative to the respective transformers of the first pair, and means mounting the armatures with the transformers of the second pair for mutually alternately and oppositely moving them into and out of the associated transformers.

8. The invention set out in claim 7 wherein means is provided for adjustably moving the armatures related to the second pair of transformers, to set positions relative to the respective transformers and thereby controlling the position of the armatures associated with the first pair of transformers relative to those transformers at which the induced voltage therein is such as to cause firing of the respective tube means.

9. The invention set out in claim 8 wherein means is provided for manually setting the armatures related to the second transformers selectively or in unison to, respectively, vary the range of reciprocation of the table, or shift the range along a greater range of capacity.

10. The invention set out in claim 4, wherein the periods in which the tube means are fired and made conducting overlap slightly.

11. Control means comprising a source of current, a pair of transformer means connected with said source, electronic tube means connected with each transformer means, reversing switch means operable by said tube means in respectively opposite directions in response to the tube means firing and conducting through their portions of circuit, a reciprocably swingable beam, armature means mounted on each end of said beam and movable alternately and mutually oppositely into and out of respective transformer means in response to swinging movement of said beam on its pivot axis, said armature means being operative in so moving into and out of said transformer means for varying the induced voltage therein and thereby oppositely firing the tube means, and means for mounting said beam for said swinging movement by a reversibly moving instrumentality the movements of which are to be controlled, and manually operable electrical means for setting the points at which the tube means become firing relative to the positions of the instrumentality.

12. The invention set out in claim 11 wherein the beam is provided with means for actuation by the controlled instrumentality in movements of the latter in directions generally longitudinally of the beam.

13. The invention set out in claim 4 in which each tube means includes a first tube for controlling the switch means and a second tube for controlling the bias on the first tube, and the induced voltage is utilized for controlling the bias on the second tube.

14. Control means for controlling the movements of a reciprocating instrumentality, comprising a source of current, a pair of transformer means connected with said source, electronic tube means connected with each transformer means, reversing switch means operable by said tube means in respectively opposite directions in response to the tube means firing and conducting through their portions of the circuit, potentiometer means interposed in circuit in series with each tube means, armature means movable into and out of said transformer means in mutually opposite directions for oppositely varying the induced voltage in the respective transformer means and thereby oppositely firing the tube means, and means for mounting the armatures for such movements relative to the transformers by a reciprocating instrumentality the movements of which are to be controlled.

15. Control means for controlling the movements of a reciprocating instrumentality, comprising a source of current, a pair of transformer means connected with said source, electronic tube means connected with each transformer means, reversing switch means operable by said tube means in respectively opposite directions in response to the tube means firing and conducting through their portions of the circuit, potentiometer means interposed in circuit in series with each tube means, armature means movable into and out of the respective transformer means in opposite and mutually exclusive directions for oppositely varying the induced voltage in the respective transformer means and thereby oppositely firing the tube means, said armature means being adapted to be moved by the controlled instrumentality, said potentiometer means being independently adjustable to vary the current to the respective tube means and thereby varying the position of each armature relative to the respective transformer means at which the corresponding tube means fires and accordingly varying the range of movement of the controlled instrumentality.

16. The invention set out in claim 15 wherein single means is provided for varying in unison the positions of the armatures relative to the corresponding transformer means at which the tube means fire and thereby shifting a given range of movement along a greater range of capacity.

17. The invention set out in claim 7 in combination with a reciprocable instrumentality operably arranged for moving the first mentioned armatures into and out of the respective transformers.

18. The combination set out in claim 11 in combination with a reversibly moving instrumentality operably arranged for swinging said beam.

19. The invention set out in claim 14 in combination with a reciprocable instrumentality operably arranged for moving said armatures relative to said transformers.

20. The invention set out in claim 15 in combination with a reciprocable instrumentality operably arranged for moving said armature means into and out of the transformer means.

References Cited in the file of this patent

UNITED STATES PATENTS

| | | |
|---|---|---|
| 1,860,499 | Furnas et al. | May 31, 1932 |
| 1,939,437 | Currier | Dec. 12, 1933 |
| 2,285,666 | King | June 9, 1942 |
| 2,370,701 | Woodbury | Mar. 6, 1945 |
| 2,541,879 | Martin | Feb. 13, 1951 |
| 2,606,312 | Rogers | Aug. 5, 1952 |
| 2,617,864 | Johnson | Nov. 11, 1952 |
| 2,626,375 | Fischer | Jan. 20, 1953 |
| 2,767,363 | Chubb | Oct. 16, 1956 |